(12) United States Patent
Dahle et al.

(10) Patent No.: US 12,114,807 B2
(45) Date of Patent: *Oct. 15, 2024

(54) OUTDOOR COOKING STATION AND SYSTEM WITH REMOVABLE INSULATED INSERT AND AND METHOD THEREOF

(71) Applicant: North Atlantic Imports, LLC, Logan, UT (US)

(72) Inventors: Roger Dahle, Providence, UT (US); Jeffrey D. Clark, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 396 days.

This patent is subject to a terminal disclaimer.

(21) Appl. No.: 17/525,868

(22) Filed: Nov. 13, 2021

(65) Prior Publication Data

US 2022/0110483 A1 Apr. 14, 2022

Related U.S. Application Data

(63) Continuation of application No. 16/584,778, filed on Sep. 26, 2019, now Pat. No. 11,202,532.

(60) Provisional application No. 62/736,662, filed on Sep. 26, 2018.

(51) Int. Cl.
| | |
|---|---|
| A47B 88/40 | (2017.01) |
| A47J 37/06 | (2006.01) |
| A47J 37/07 | (2006.01) |
| F24C 15/18 | (2006.01) |
| F24C 15/30 | (2006.01) |

(52) U.S. Cl.
CPC ........... *A47J 37/0786* (2013.01); *A47B 88/40* (2017.01); *A47J 37/0682* (2013.01); *A47J 37/0713* (2013.01); *F24C 15/18* (2013.01); *F24C 15/30* (2013.01)

(58) Field of Classification Search
CPC ................ A47J 37/0786; A47J 37/0682; A47J 37/0713; A47B 88/40; F24C 15/18; F24C 15/30
USPC ........................................................ 126/25 R
See application file for complete search history.

(56) References Cited

U.S. PATENT DOCUMENTS

| | | | |
|---|---|---|---|
| 2,608,191 | A | 8/1952 | Schmidt et al. |
| 4,089,554 | A | 5/1978 | Myers |
| 4,574,689 | A | 3/1986 | Robertson |
| 5,154,158 | A | 10/1992 | Lindsey |
| 6,575,155 | B2 | 6/2003 | Brennan |
| 6,725,855 | B1 | 4/2004 | Brennan |
| 6,776,778 | B2 | 8/2004 | Prince |

(Continued)

*Primary Examiner* — Avinash A Savani
(74) *Attorney, Agent, or Firm* — David L. Stott (57) ABSTRACT

An outdoor cooking station with a main body extending to define an upper portion and a lower portion, the lower portion configured to receive an insulated insert. The upper portion including heating elements supported by frame components of the cooking station and one or more heat shields suspended below the heating elements acting as a barrier to substantially prevent heat from reaching the lower portion of the main body. The lower portion of the main body defining a first storage space and a second storage space, the second storage space positioned below the first storage space, the second storage space exhibiting a drawer structure. The insulated insert is sized and configured to be removably positioned within the second storage space, the insulated insert defining a cubical type external structure to define a hollow space therein, the hollow space accessible through a lid member of the insulated insert.

20 Claims, 4 Drawing Sheets

(56) References Cited

U.S. PATENT DOCUMENTS

| | | |
|---|---|---|
| 6,923,172 B2 | 8/2005 | Muldoon |
| 8,490,614 B1 | 7/2013 | Gregory |
| 8,776,778 B1 | 7/2014 | Brown |
| 9,476,638 B1 | 10/2016 | Tyler |
| 2008/0163862 A1 | 7/2008 | Cartwright |
| 2008/0245357 A1 | 10/2008 | Meether et al. |
| 2015/0013664 A1 | 1/2015 | Riel |
| 2017/0143162 A1 | 5/2017 | Olsen |

OUTDOOR COOKING STATION AND SYSTEM WITH REMOVABLE INSULATED INSERT AND AND METHOD THEREOF

CROSS-REFERENCE TO RELATED APPLICATIONS

This application is a continuation of U.S. patent application Ser. No. 16/584,778, filed Sep. 26, 2019, which claims the benefit of U.S. Provisional Application No. 62/736,662, filed Sep. 26, 2018, the disclosures of which are hereby incorporated by reference herein in their entirety.

TECHNICAL FIELD

The present invention relates generally to outdoor type cooking stations and, more specifically, the present invention relates to a removable insulated insert or accessory component for cooking stations and other functional components for cooking stations to enhance the outdoor cooking experience.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat cooking surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Whether cooking on a grill or griddle type cooking surface, managing food and cleanliness in the outdoor cooking setting as well as keeping organization and ready access to cooking items, spices, and utensils often becomes problematic in the cooking process. Further, the outdoor barbequing experience often lends itself to enjoying cold beverages while cooking. As such, ready access to tools for keeping the barbequing area clean and the ability to keep various cooking items, beverages, spices, and utensils organized within a given cooking station would enhance the outdoor barbequing experience.

BRIEF SUMMARY OF THE INVENTION

The present invention is directed to various embodiments of an outdoor cooking station or accessory components for an outdoor cooking station. In one embodiment, the outdoor cooking station includes a main body and an insulated insert. The main body includes a frame structure and one or more heating elements supported by the frame structure. The frame structure of the main body extends to define an upper portion and a lower portion with a heat shield extending horizontally to extend, and act as a separation, between the upper portion and the lower portion of the main body. The upper portion defines an upper edge periphery sized and configured to support a cooking surface, the cooking surface positioned so as to be disposed above the one or more heating elements. The frame structure extends downward from the upper edge periphery to a lower edge periphery of the lower portion of the main body. The lower portion of the main body defines a first storage space and a second storage space, the second storage space positioned below the first storage space such that the second storage space exhibits a drawer structure. The insulated insert is sized and configured to be removably positioned within the second storage space. The insulated insert defines a cubical type external structure to define a hollow space therein, the hollow space being accessible through a lid member of the insulated insert.

In one embodiment, the heat shield extends below the one or more heating elements with a gap space below structure extending below the one or more heating elements. In another embodiment, the heat shield extends below the one or more heating elements to block heat from the lower portion of the main body.

In another embodiment, the insulated insert extends to define an internal surface, the internal surface defining the hollow space of the insulated insert, the internal surface being a water impermeable material. In still another embodiment, the insulated insert extends with an outer wall and an inner wall with a void therebetween, the outer and inner walls being coupled to each other with multiple spacers therebetween. In yet another embodiment, the insulated insert extends with an outer wall and an inner wall with multiple spacers therebetween to define a gap between the outer wall and the inner wall, the gap including an insulation material therein. In another embodiment, the insulated insert extends with an outer wall and an inner wall with insulation material therebetween, the outer wall and the inner wall being a flexible material and an inner surface of the inner wall being water impermeable. In still another embodiment, the insulated insert extends with an outer wall and an inner wall with spacers therebetween, the outer wall and the inner wall being a seamless monolithic structure.

In another embodiment, the cooking surface includes a griddle member. In another embodiment, the main body includes a first side shelf and a second side shelf extending from opposite sides of the main body, the first side shelf including a magnetic strip along a surface of the first side shelf, the second side shelf including multiple hooks attached thereto. In another embodiment, the main body includes at least two wheels coupled adjacent to the lower edge portion of the main body, the at least two wheels configured to facilitate portability of the main body.

In another embodiment, the first storage space is directly above the second storage space, the first storage space including structure to block heat from the one or more heating elements in the upper portion of the main body. In another embodiment, the drawer structure defines the second storage space positioned directly above and adjacent the lower edge periphery of the main body.

In accordance with another embodiment of the present invention, an accessory component for an outdoor cooking station is provided. Such outdoor cooking station includes a main body having a frame structure and one or more heating elements supported by the frame structure. The frame structure of the main body extends to define an upper portion and a lower portion with a heat shield extending horizontally to extend, and act as a separation, between the upper portion and the lower portion of the main body. The upper portion defines an upper edge periphery sized and configured to support a cooking surface, the cooking surface positioned so as to be disposed above the one or more heating elements. The frame structure extends downward from the upper edge periphery to a lower edge periphery of the lower portion of the main body. The lower portion of the main body defines a first storage space and a second storage space, the second storage space positioned below the first storage space, the second storage space exhibiting a drawer structure. The accessory component for the outdoor cooking station includes an insulated insert sized and configured to be removably positioned within the second storage space, the insulated insert defining a cubical type external structure to define a hollow space therein, the hollow space accessible through a lid member of the insulated insert.

In one embodiment, the insulated insert extends to define an internal surface, the internal surface defining the hollow space of the insulated insert, the internal surface being a water impermeable material. In another embodiment, the insulated insert extends with an outer wall and an inner wall with a void therebetween, the outer and inner walls being coupled to each other with multiple spacers therebetween. In still another embodiment, the insulated insert extends with an outer wall and an inner wall with multiple spacers therebetween to define a gap between the outer wall and the inner wall, the gap including an insulation material therein. In another embodiment, the insulated insert extends with an outer wall and an inner wall with insulation material therebetween, the outer wall and the inner wall being a flexible material and an inner surface of the inner wall being water impermeable. In yet another embodiment, the insulated insert extends with an outer wall and an inner wall with spacers therebetween, the outer wall and the inner wall being a seamless monolithic structure.

In accordance with another embodiment of the present invention, an outdoor cooking station is provided. The outdoor cooking station includes a main body and an insulated insert. The main body extends to define an upper portion and a lower portion, the upper portion including heating elements supported by frame components of the main body and one or more heat shields suspended below the heating elements acting as a barrier to substantially prevent heat from reaching the lower portion of the main body. The lower portion of the main body defines a first storage space and a second storage space, the second storage space positioned below the first storage space, the second storage space exhibiting a drawer structure. The insulated insert is sized and configured to be removably positioned within the second storage space. The insulated insert defines a cubical type external structure to define a hollow space therein, the hollow space accessible through a lid portion of the insulated insert.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
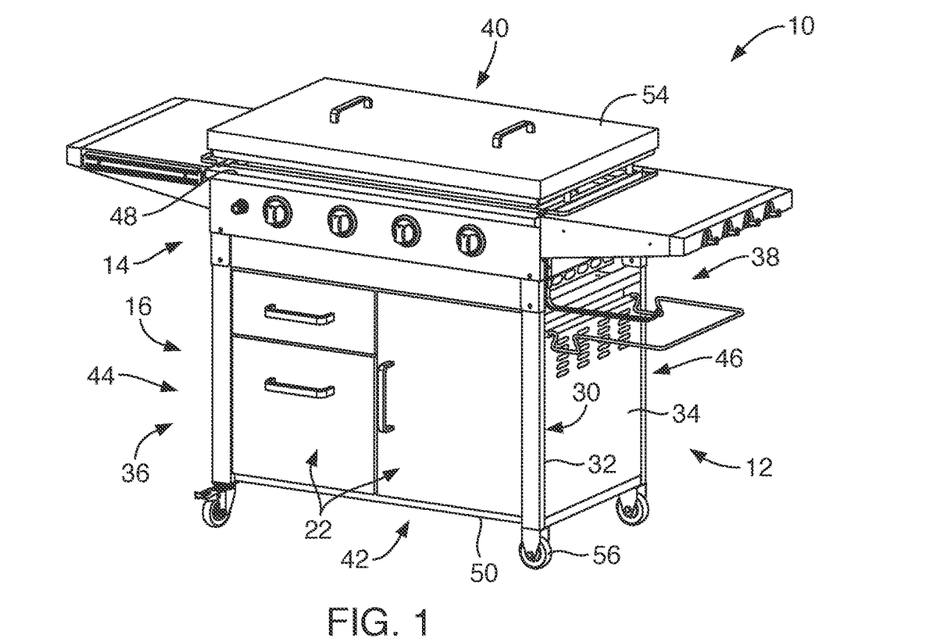
FIG. 1 is a perspective view of an outdoor cooking station, depicting a cabinet type lower portion associated with the cooking station and a lid covering a griddle member (not shown) at an upper portion of the cooking station, according to an embodiment of the present invention.
Figure 2:
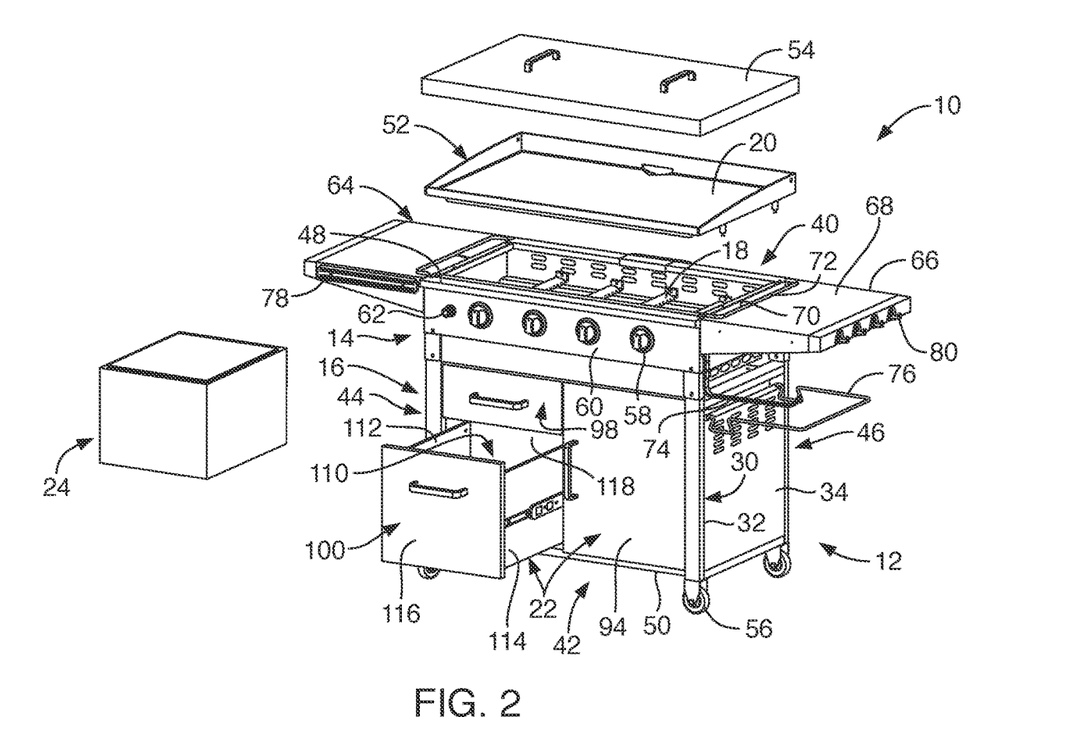
FIG. 2 is a partial exploded view of the cooking station, depicting one drawer with a removable insert sized to be positioned in the one drawer of the cooking station, according to another embodiment of the present invention.

Referring to FIGS. 1 and 2, a cooking station 10 and system with multiple components to facilitate better functionality to enhance the outdoor cooking experience is provided. The cooking station 10 may be a stand-alone outdoor cooking station and may include structural characteristics that facilitate portability of the cooking station 10. The cooking station 10 may include a main body 12 with an upper portion 14 and a lower portion 16, the upper portion 14 including heating elements 18 for heating a cooking surface 20 and the lower portion 16 including multiple storage spaces 22. In one embodiment, one storage space may be sized and configured to receive a removable insulated insert 24. Such removable insulated insert 24 may define an enclosable space 26 with an inner surface 28 or layer that may be water impermeable. The removable insulated insert 24 may be employed for storing ice, cold beverages and/or any item desirable to keep cool. The cooking station 10 may include other functional components to enhance the efficiency and assist the user while cooking food with the cooking station 10.

Figure 3:
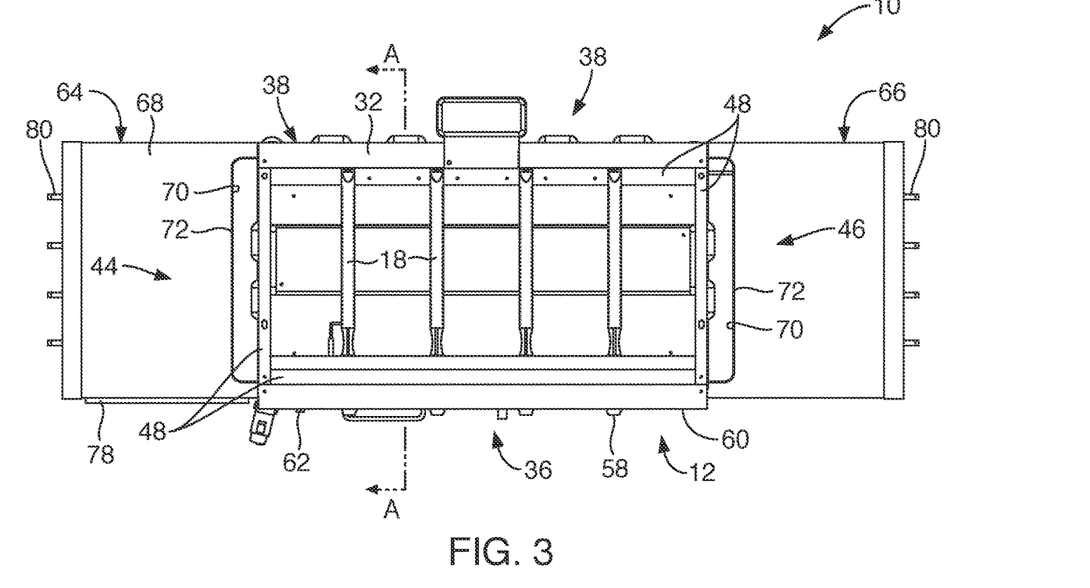
FIG. 3 is a top view of the outdoor cooking station with the lid and griddle member removed, depicting the heating elements of the cooking station, according to another embodiment of the present invention.

With reference to FIGS. 1-3, the main body 12 of the cooking station 10 may extend with frame components 30 including vertically and horizontally extending frame members 32 and panels 34 positioned over portions of the frame members 32 to define a generally box shaped cubical structure. Such main body 12 may define a front side 36, a rear side 38, an upper side 40, a bottom side 42, a first side 44 and a second side 46. The first and second sides 44, 46 may be opposite left and right sides of the main body 12. Similarly, the front side 36 may be opposite the rear side 38 and the upper side 40 may be opposite the bottom side 42. One or more of the sides may not be fully enclosed with panels, such as the rear side 38 or first and second sides 44, 46 of the main body 12. The frame components 30, including the frame members 32 and panels 34 may extend between the upper and bottom sides 40, 42 to define an upper edge 48 and a lower edge 50 of the main body 12. The upper edge 48 of the main body 12 may extend with a generally rectangular configuration or periphery. Similarly, the lower edge 50 may extend with a generally rectangular configuration or periphery. In this manner, the main body 12 may extend between the upper edge 48 and the lower edge 50 with a generally cubical shape.

The upper edge 48 or structure adjacent the upper edge 48 may be sized and configured to support the cooking surface 20, such as a griddle member 52 and/or a grill/grate (not shown). Further, the cooking station 10 may include a lid 54 for positioning over the griddle member 52 or grill. The lid 54 may be an unattached component, relative to the main body 12, and may be sized and configured to cover the griddle member 52 or grill for protection of the cooking surface 20 during non-use of the cooking station 10. The lid 54 may exhibit a low-profile configuration and may be sized to sit or rest on the griddle member 52 in a free-standing manner. In another embodiment, the cooking station 10 may include a lid 54 that is attached to the rear side 38 of the main body 12 so as to pivot between an open position and closed position.

The lower edge 50 of the main body 12 of the cooking station 10 may include two or more wheels 56, such as caster wheels, secured to, or adjacent to, the lower edge 50 of the main body 12. Such two or more wheels 56 may facilitate portability of the cooking station 10 so that the cooking station 10 may be readily moved to a desired location. Further, the two or more wheels 56 may include a locking feature to provide stability to the cooking station 10 as desired. In a preferred embodiment, the lower edge 50 of the main body 12 may include four wheels 56 adjacent to corners of the lower edge 50.

Now with reference to FIGS. 2 and 3, as previously set forth, the main body 12 includes the upper portion 14 and the lower portion 16. The upper portion 14 may include frame components 30 extending vertically and horizontally below the upper edge 48 that may support the heating elements 18. For example, the heating elements 18 may extend below the upper edge 48 of the main body 12 between the front side 36 and rear side 38 of the main body 12 so as to be secured to portions of the frame components 30. In one embodiment, the cooking station 10 may include four heating elements 18. In another embodiment, the cooking station 10 may hold between two to six heating elements 18 or more. Such heating elements 18 may be controlled with burner control valves 58 or knobs positioned on an external surface of the cooking station 10, such as along a front panel 60 of the upper portion 14 of the main body 12. Each burner control valve 58 may be associated with one of the heating elements 18. Each of the heating elements 18 may hold structure for feeding pressurized fuel therethrough, such as propane gas or natural gas, and controlled with the burner control valves 58 or knobs, as known to one of ordinary skill in the art. In addition, the front panel 60 may include an ignitor switch 62 that may be depressed to provide a spark to ignite the gas fueled heating elements 18. The cooking station 10 may include various typical components to facilitate igniting the heating elements 18 of the cooking station 10, such as various valves, tubing, manifold, gas couplings, fasteners, propane gas tank, and any other components, as known to one of ordinary skill in the art.

Further, the upper portion 14 of the main body 12 may include additional structure associated therewith. For example, in one embodiment, the cooking station 10 may include a first side shelf 64 and a second side shelf 66. Each of the first and second side shelves 64, 66 may be coupled to respective first and second sides 44, 46 of the main body 12. The first and second side shelves 44, 46 may be secured to the main body 12 such that an upward facing surface 68 of the first and second side shelves 64, 66 may be substantially level or substantially flush with the upper edge 48 of the main body 12. In another embodiment, the first and second side shelves 64, 66 may be disposed a predetermined distance below the upper edge 48 of the main body 12.

Further, the first and second side shelves 64, 66 may include various structure and features integrated therewith or positioned adjacent to the first and second side shelves 64, 66. For example, the first and second side shelves 64, 66 may include an elongated opening 70 or recess defined therein with a ridge 72 extending upward adjacent to the elongated opening 70. Such ridge 72 and elongated opening 70 defined in the first and second side shelves 64, 66 may extend adjacently along the respective first and second sides 44, 46 of the upper edge 48 of the cooking station 10 so as to act as a safety feature in discouraging users of the cooking station 10 from placing cooking items too close to the upper edge 48 and hot air funneling around, for example, the griddle member 52 of the cooking station 10.

In another embodiment, the first and second side shelves 64, 66 may include structure for holding cooking utensils (not shown) or the like. For example, the first side shelf 64 may include a magnetic strip 78 positioned over the front side 36 of the first side shelf 64. Further, the first side shelf 64 and/or the second side shelf 66 may include hooks 80 secured to an outer side thereof. In this manner, the hooks 80 and the magnetic strip 78 may be employed for holding various cooking utensils for ready access while cooking on the cooking station 10. Furthermore, below the first side shelf 64 and/or the second side shelf 66, an elongated holder arm 74 may be secured to the respective first side 44 and/or the second side 46 of the main body 12. Such elongated holder arm 74 may be sized and configured to hang a towel or a paper towel roll thereto, for example, or any other item that may be useful for hanging thereto. Also, the first and/or second sides 44, 46 of the main body 12 may exhibit structure for holding a removable waste bag holder 76, the waste bag holder being removably positionable over one of the panels 34 of the first and second sides 44, 46 of the main body 12.

Figure 4:
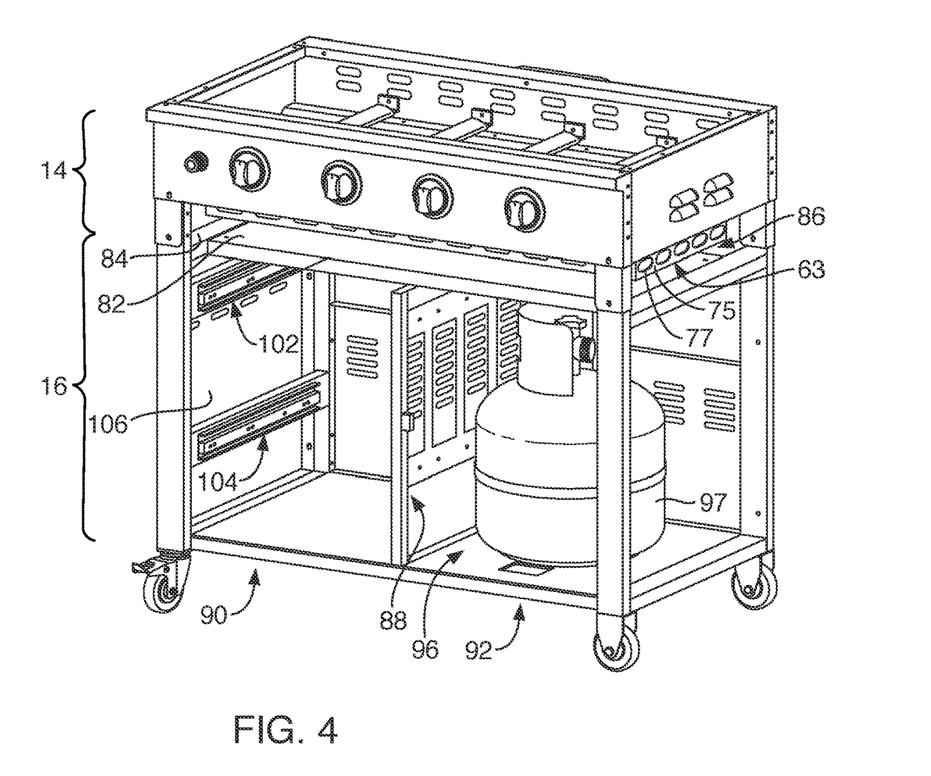
FIG. 4 is a perspective view of a frame structure of the outdoor cooking station, depicting some panel portions of the cooking station removed, according to another embodiment of the present invention.
Figure 5:
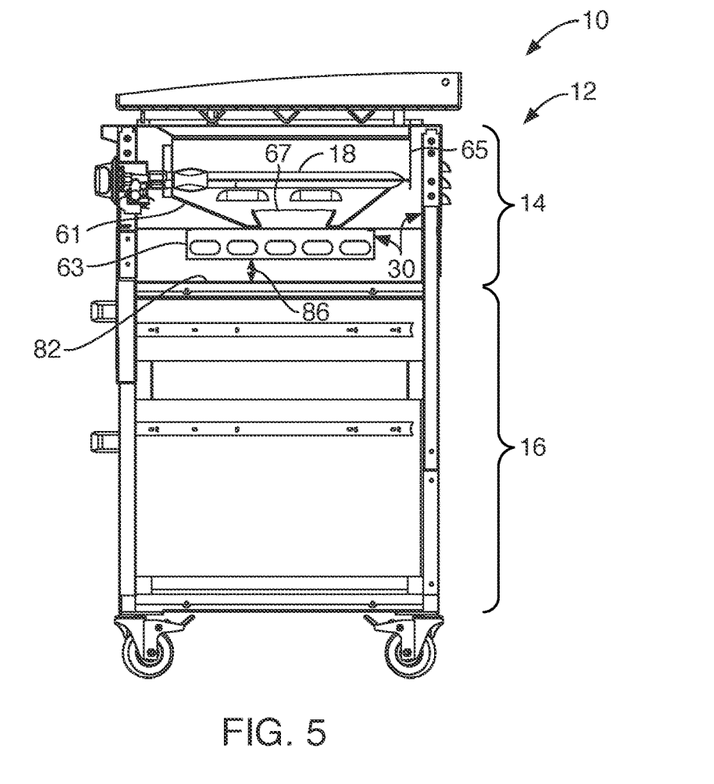
FIG. 5 is a cross-sectional view taken along section A-A of FIG. 3 (but showing the griddle member thereon) of the cooking station, according to another embodiment of the present invention.
Figure 6:
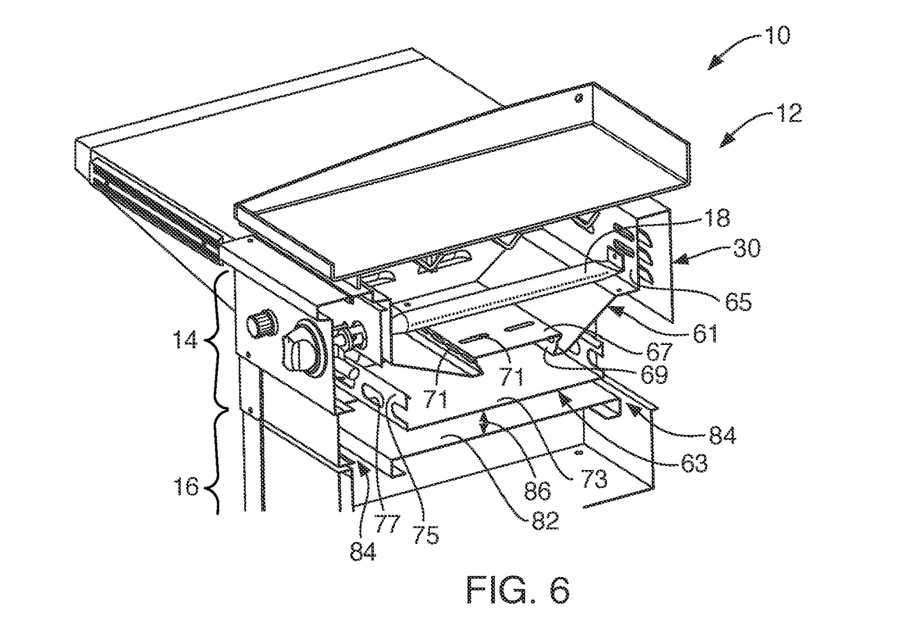
FIG. 6 is a partial perspective cross-sectional view of the upper portion of the cooking station, depicting the heating elements and multiple heat shields positioned below the heating elements, according to another embodiment of the present invention.

With reference to FIGS. 4, 5 and 6, as previously set forth, the main body 12 of the cooking station 10 may include the upper and lower portions 14, 16. The upper portion 14 may include frame components 30 sized and configured to support and/or provide air flow to the heating elements 18 as well as block heat from the lower portion 16 of the main body 12. Such frame components 30 may include a first vented heat shield 61 and a second vented heat shield 63, each spaced apart below the heating elements 18. For example, the heating elements 18 may extend between, and be coupled to, upward extending flanges 65 of the first vented heat shield 61. But for the upward extending flanges 65, the first vented heat shield 61 may extend below the heating elements 18. Such first vented heat shield 61 may be spaced from the heating elements 18 and may act to block downward radiation heat and downward convection heat. In one embodiment, the first vented heat shield 61, along a cross-section thereof (as depicted in FIG. 6), may extend with a generally w-shaped configuration. For example, the first vented heat shield 61 may include a horizontally extending middle portion 67 with opposing sides 69 extending inwardly downward and then extend at an upward angle toward the upwardly extending flanges 65. Further, the first vented heat shield 61 may include multiple vents 71 defined therein. The vents 71 may be positioned along the opposing sides 69 that extend inwardly downward from the horizontally extending middle portion 67. Further, some vents 71 may be positioned and spaced along the horizontally extending middle portion 67. Such vents 71 defined in the first vented heat shield 61 may be sized and configured to provide appropriate air flow to the heating elements 18 for appropriate burning of the fuel.

Further, additional frame components 30 extending below the heating elements 18 may include the second vented heat shield 63. The second vented heat shield 63 may be positioned below, and spaced apart from, the first vented heat shield 61. The second vented heat shield 63 may extend with a rectangular flat sheet 73 with upstanding portions 75 extending vertically along the periphery of the rectangular flat sheet 73. The upstanding portions 75 may define vents 77 therein. The flat sheet 73 may act as another barrier to block heat from the lower portion 16 of the main body 12 and the vents 77 defined in the upstanding portions 75 may act to provide air flow to the heating elements 18.

Now with reference to FIGS. 2, 4, 5 and 6, additional frame components 30 of the main body 12 may include a lower heat shield 82. The lower heat shield 82 may extend along a bottom of the upper portion 14 of the main body 12 and along a top of the lower portion 16 of the main body 12 so as to act as a separation between the upper portion 14 and the lower portion 16 of the main body 12. Such lower heat shield 82 may extend between frame components 30 of the first and second sides 44, 46 of the main body 12 and may extend between the front and rear sides 36, 38 of the main body 12. The lower heat shield 82 may act as an additional barrier disposed between the upper and lower portions 14, 16 of the main body 12 for blocking heat from radiating into the lower portion 16 of the main body 12. In one embodiment, the lower heat shield 82 may be directly secured to the frame components 30 of the first and second sides 44, 46 of the main body 12. In another embodiment, the lower heat shield 82 may extend so as to leave a gap 84 relative to the front side 36 of the main body 12 to facilitate air flow into the upper portion 14 of the main body 12. This lower heat shield 82 may be suspended below, and may be in addition to, other structural components, i.e., the first and second vented heat shields 61, 63, positioned below the heating elements 18, so as to leave an upper gap 86 relative to the other structural components below the heating elements 18.

Now with reference to FIGS. 2 and 4, as previously set forth, the lower portion 16 may include a cabinet like structure with various storage spaces 22 defined therein. For example, in one embodiment, the lower portion 16 of the main body 12 may include a vertically extending panel 88 and frame structure that may extend between the lower heat shield 82 or heat guard and the bottom side 42 or lower edge 50 of the main body 12. Such vertically extending panel 88 may divide the lower portion 16 of the main body 12 into two sides, a first front side 90 and a second front side 92. The second front side 92 may define a front door 94 for accessing a second side storage space 96 defined in the second front side 92 of the main body 12. The second side storage space 96 may be sized and configured to store, for example, a propane tank 97 for feeding pressurized propane gas to the heating elements 18, or for storage of any other suitable cooking tools or the like.

In one embodiment, the first front side 90 of the lower portion 16 of the main body 12 may include an upper drawer 98 and a lower drawer 100 such that the lower drawer 100 may be positioned directly below the upper drawer 98. The upper and lower drawers 98, 100 may roll or slide along first and second sets of tracks 102, 104 secured to an inside surface 106 of the frame components 30 of the main body 12 within the first front side 90 of the lower portion 16. For example, the first and second set of tracks 102, 104 may extend along the inside surface 106 of the first side 44 of the main body 12 and along the vertically extending panel 88, one set above the other, so as to be aligned to receive the upper and lower drawers 98, 100 along the respective first and second sets of tracks 102, 104. The upper drawer 98 and the lower drawer 100 may each be moved between open and closed positions such that, in the open positions, the upper drawer 98 may provide access to and define an upper drawer storage space (not shown) and the lower drawer 100 may provide access to define a lower drawer storage space 110. The lower drawer storage space 110 may be larger than the upper drawer storage space. The upper drawer storage space of the upper drawer 98 may be employed for storing any suitable cooking items, such as spices or the like and/or any suitably sized cooking utensils as desired.

Figure 7:
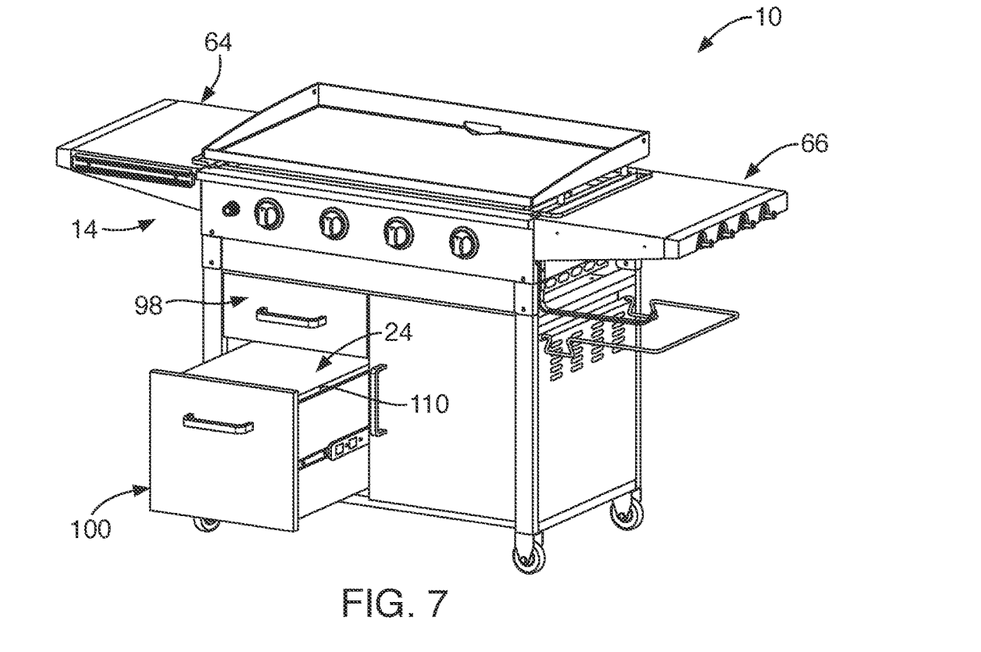
FIG. 7 is a perspective view of the cooking station, depicting the removable insulated insert positioned within the one drawer in an open position, according to another embodiment of the present invention.

With reference to FIGS. 2 and 7, the lower drawer 100 may be employed for storing any suitable item desired by the user. Further, the lower drawer 100 may be sized and configured to receive an accessory component, such as the insulated insert 24 or a cooler member. The lower drawer storage space 110 of the lower drawer 100 may be defined by first and second side drawer walls 112, 114, front and rear drawer walls 116, 118, and a floor (not shown). The upper wall may be defined by the floor of the upper drawer 98. The insulated insert 24 may be sized and configured to be readily positioned within the lower drawer storage space 110, as shown in FIG. 7, defined by the lower drawer 100 as well as readily removable from the lower drawer storage space 110 upon the lower drawer 100 being moved to the open position, as depicted in FIG. 2. As previously indicated, the insulated insert 24 may be insulated so that a user can keep ice and beverages cool while cooking with the cooking station 10.

Figure 8:
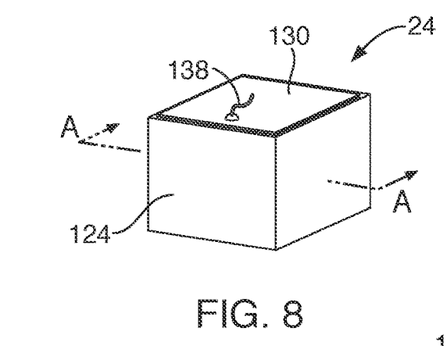
FIG. 8 is a perspective view of the removable insulated insert, according to another embodiment of the present invention.
Figure 8A:
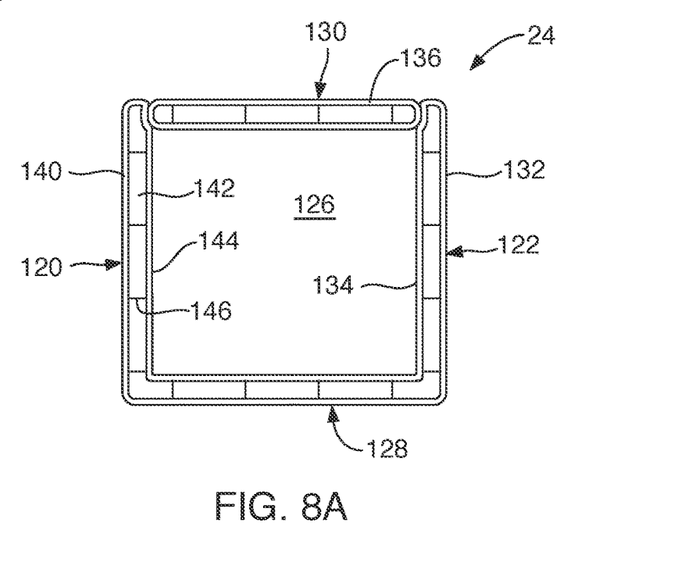
FIG. 8A is a cross-sectional view of the removable insert taken along section A-A of FIG. 8, according to another embodiment of the present invention.

Now with reference to FIGS. 8 and 8A, the insulated insert 24 may extend with a cubical shape sized to be positioned within the lower drawer 100. As such, the insulated insert 24 may define first and second side walls 120, 122, front and rear walls 124, 126, and lower and top walls 128, 130 each extending to define an external surface 132 and an internal surface 134. The top wall 130 may be in the form of a lid member 136 that may be moved between a closed position and an open position. In the closed position, the lid member 136 may be an interference type fit. To move the lid member 136 to the open position, the lid member 136 may be removed with a pull piece 138 coupled to an end portion adjacent the front wall 124, for example, of the lid member 136. Further, in the open position, the lid member 136 may be completely separated from the remaining portion of the insulated insert 24 or may maintain a connection at one end, for example, at the rear wall 126.

The insulated insert 24 may be formed of multiple layers or, in part, walls. For example, in one embodiment, the insulated insert may include a first layer 140 or outer wall, a second layer 142 and a third layer 144 or inner wall. In another embodiment, the insulated insert 24 may include additional layers. The first layer 140 may be an outer layer that may include the external surface 132 on one side thereof of the insulated insert 24. The second layer 142 may be a middle layer that may include insulation type material. The third layer 144 may be an inner layer that may include the internal surface 134 of the insulated insert 24. The second layer 142 or middle layer may be disposed between the first layer 140 and the third layer 144. In another embodiment, the second layer may be a void or space between the first and third layers 140, 144 or outer and inner walls.

In one embodiment, the first layer 140 and the third layer 144 of the insulated insert 24 may be formed of a rigid material such that the external surface 132 and the internal surface 134 may be rigid and made of a polymeric material. In another embodiment, the first layer 140 may be a polymeric material with high temperature ratings. In another embodiment, the rigid material of the third layer 144 may be made of a water impermeable layer. In another embodiment, the first layer 140 and the third layer 144 may be coupled together with spacers 146 so as to hold the first layer 140 a predetermined distance relative to the third layer 144 to provide a space gap between the first layer 140 and the third layer 144. Within such space gap, the second layer may be an insulation material disposed between the first and third layers 140, 144. In another embodiment, the space gap between the first and third layers 140, 144 may define a void or an air gap with only the spacers 146 extending between the first and third layers 140, 144. In another embodiment, the first and third layers 140, 144 of the insulated insert 124, but for the lid member 136, may be unitary seamless and monolithic structure. In another embodiment, the first and third layers 140, 144 and including the lid member 136 may be a unitary seamless and monolithic structure.

In another embodiment, the first layer 140 of the insulated insert 24 may be formed of a rigid material and the third layer 144 of the insulated insert may be formed of a flexible material. In still another embodiment, the first layer 140 and the third layer 144 of the insulated insert 24 may be formed of a flexible material. In another embodiment, the top wall 130 of insulated insert 24 may be openable with a zipper type mechanism extending at least partially along a periphery of the top wall 130 of the insulated insert 24. In one embodiment, the flexible material of the various embodiments set forth above may be a water impermeable polymeric material.

With reference to FIGS. 6 and 7, as set forth, the cooking station 10 may include various functional components integrated therewith to facilitate ready access to cooking utensils, spices, clean-up type products, and any other type of product to assist the user while cooking. In addition, the cooking station 10 provides the lower drawer storage space 110 that may hold a removable insulated insert 24 therein that may hold ice or the like for keeping beverages cool or any other item desired to keep cool. Such lower drawer storage space 110 may include multiple barriers of separation from the heating elements 18 of the upper portion 14 of the cooking station 10, such as the upper drawer 98, the lower heat shield 82, and the first and second vented heat shields 61, 63. In this manner, while the heating elements 18 are in use, there may be multiple structural components and gaped layers of separation to substantially prevent heat from reaching the lower drawer 100 and insulated insert 24. As such, the cooking station 10 described herein is designed to enhance the outdoor cooking experience with the insulated insert 24 accessory and with the functional components along the first and second side shelves 64, 66 to make cooking more efficient and enjoyable for the user.

The various structural components of the various embodiments of the main body 12 of the cooking station 10 and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station, comprising:
a main body including a frame structure and one or more heating elements supported by the frame structure, the frame structure of the main body extending to define an upper portion and a lower portion with a heat shield extending horizontally to extend, and act as a separation, between the upper portion and the lower portion of the main body, the upper portion defining an upper edge periphery sized and configured to support a cooking surface, the cooking surface positioned so as to be disposed above the one or more heating elements, the frame structure extending downward from the upper edge periphery to a lower edge periphery of the lower portion of the main body, the lower portion of the main body defining a storage space, the storage space exhibiting a drawer structure; and
an insulated insert sized and configured to be removably positioned within the storage space, the insulated insert including a hollow space defined therein, the hollow space accessible through a lid portion of the insulated insert;
wherein the heat shield extends below the one or more heating elements to block heat from the lower portion of the main body.

2. The outdoor cooking station of claim 1, wherein the heat shield extends below the one or more heating elements with a gap space below structure extending below the one or more heating elements.

3. The outdoor cooking station of claim 1, wherein the insulated insert extends to define an internal surface, the internal surface defining the hollow space of the insulated insert, the internal surface being a water impermeable material.

4. The outdoor cooking station of claim 1, wherein the insulated insert extends with an outer wall and an inner wall with spacers therebetween, the outer wall and the inner wall being a seamless monolithic structure.

5. The outdoor cooking station of claim 1, wherein the main body includes a first side shelf and a second side shelf extending from opposite sides of the main body, the first side shelf including a magnetic strip along a surface of the first side shelf, the second side shelf including multiple hooks attached thereto.

6. The outdoor cooking station of claim 1, wherein the drawer structure is positioned directly below an upper drawer structure.

7. An accessory component for an outdoor cooking station, the outdoor cooking station including a main body having a frame structure and one or more heating elements supported by the frame structure, the frame structure of the main body extending to define an upper portion and a lower portion with a heat shield extending horizontally to extend, and act as a separation, between the upper portion and the lower portion of the main body, the upper portion defining an upper edge periphery sized and configured to support a cooking surface, the cooking surface positioned so as to be disposed above the one or more heating elements, the frame structure extending downward from the upper edge periphery to a lower edge periphery of the lower portion of the main body, the lower portion of the main body defining a storage space, the storage space exhibiting a drawer structure, the accessory component comprising:

an insulated insert sized and configured to be removably positioned within the storage space, the insulated insert including a hollow space defined therein, the hollow space accessible through a lid portion of the insulated insert;

wherein the insulated insert extends to define an internal surface, the internal surface defining the hollow space of the insulated insert, the internal surface being a water impermeable material.

8. The accessory component of claim 7, wherein the insulated insert extends with an outer wall and an inner wall with a void therebetween, the outer and inner walls being coupled to each other with multiple spacers therebetween.

9. The accessory component of claim 7, wherein the insulated insert extends with an outer wall and an inner wall with multiple spacers therebetween to define a gap between the outer wall and the inner wall, the gap including an insulation material therein.

10. The accessory component of claim 7, wherein the insulated insert extends with an outer wall and an inner wall with insulation material therebetween, the outer wall and the inner wall being a flexible material and an inner surface of the inner wall being water impermeable.

11. The accessory component of claim 7, wherein the insulated insert extends with an outer wall and an inner wall with spacers therebetween, the outer wall and the inner wall being a seamless monolithic structure.

12. An outdoor cooking station comprising a main body extending to define an upper portion and a lower portion, the upper portion including heating elements supported by frame components of the main body and one or more heat shields suspended below the heating elements acting as a barrier to substantially prevent heat from reaching the lower portion of the main body, the lower portion of the main body including a storage space, the storage space exhibiting a drawer structure; and an insulated insert sized and configured to be removably positioned within the storage space, the insulated insert defining a hollow space therein, the hollow space accessible through a lid portion of the insulated insert;

wherein the insulated insert extends to define an internal surface, the internal surface defining the hollow space of the insulated insert, the internal surface being a water impermeable material.

13. The outdoor cooking station of claim 12, wherein the heat shield extends below the one or more heating elements with a gap space below structure extending below the one or more heating elements.

14. The outdoor cooking station of claim 12, wherein the heat shield extends below the one or more heating elements to block heat from the lower portion of the main body.

15. The outdoor cooking station of claim 12, wherein the insulated insert extends with an outer wall an inner wall with a void therebetween, the outer and inner walls being coupled to each other with spacers therebetween.

16. The outdoor cooking station of claim 12, wherein the insulated insert extends with an outer wall and an inner wall with multiple spacers therebetween to define a gap between the outer wall and the inner wall, the gap including an insulation material therein.

17. The outdoor cooking station of claim 12, wherein the insulated insert extends with an outer wall and an inner wall with insulation material therebetween, the outer wall and the inner wall being a flexible material and the internal surface of the inner wall being water impermeable.

18. The outdoor cooking station of claim 12, wherein the insulated insert extends with an outer wall and an inner wall with spacers therebetween, the outer wall and the inner wall being a seamless monolithic structure.

19. The outdoor cooking station of claim 12, wherein the main body includes a first side shelf and a second side shelf extending from opposite sides of the main body, the first side shelf including a magnetic strip along a surface of the first side shelf, the second side shelf including multiple hooks attached thereto.

20. The outdoor cooking station of claim 12, wherein the drawer structure is positioned directly below an upper drawer structure.

* * * * *